US 9,726,054 B2

(12) United States Patent
Berndt

(10) Patent No.: US 9,726,054 B2
(45) Date of Patent: Aug. 8, 2017

(54) MULTI-POSITION CAMSHAFT PHASER WITH TWO ONE-WAY CLUTCHES

(71) Applicant: Schaeffler Technologies AG & Co. KG, Herzogenaurach (DE)

(72) Inventor: Eric Berndt, Whitefish Bay, WI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 40 days.

(21) Appl. No.: 14/932,166

(22) Filed: Nov. 4, 2015

(65) Prior Publication Data

US 2017/0122145 A1   May 4, 2017

(51) Int. Cl.

| F01L 1/46   | (2006.01) |
| F16D 41/08  | (2006.01) |
| F01L 1/344  | (2006.01) |
| F16D 13/26  | (2006.01) |
| F01L 1/34   | (2006.01) |
| F01L 1/352  | (2006.01) |
| F02D 13/02  | (2006.01) |
| F02D 41/00  | (2006.01) |

(52) U.S. Cl.
CPC ...... *F01L 1/46* (2013.01); *F01L 1/34* (2013.01); *F01L 1/344* (2013.01); *F01L 1/34409* (2013.01); *F01L 1/352* (2013.01); *F02D 13/0219* (2013.01); *F16D 13/26* (2013.01); *F16D 41/08* (2013.01); *F02D 2041/001* (2013.01); *Y02T 10/18* (2013.01)

(58) Field of Classification Search
CPC ..... F01L 1/46; F01L 1/344; F01L 1/34; F01L 1/34409; F01L 1/352; F16D 41/08; F16D 13/26; F02D 2041/001; F02D 13/0219; Y02T 10/18

USPC ................................. 123/90.15–90.17
See application file for complete search history.

(56) References Cited

U.S. PATENT DOCUMENTS

| 7,669,566 B2    | 3/2010 | Methley |
| 2011/0162605 A1 | 7/2011 | Wigsten |

FOREIGN PATENT DOCUMENTS

GB         191305925 A  *  0/1914  ............. F16D 13/26

* cited by examiner

*Primary Examiner* — Mark Laurenzi
*Assistant Examiner* — Wesley Harris

(57) ABSTRACT

A camshaft phaser, including: a gear to receive torque; a housing non-rotatably connected to the gear; and a phase adjustment assembly. The phase adjustment assembly includes: first and second frusto-conical shaped surfaces arranged to non-rotatably connect to a camshaft; third and fourth frusto-conical shaped surfaces; and a displacement assembly. The displacement assembly is arranged to: for an advance mode, displace the first frusto-conical surface in the first axial direction to non-rotatably connect the first and third frusto-conical surfaces and so that the second frusto-conical surface is rotatable with respect to the fourth frusto-conical surface in a first circumferential direction; and for a retard mode, displace the second frusto-conical surface in the second axial direction to non-rotatably connect the second and fourth frusto-conical surfaces and so that the first frusto-conical surface is rotatable with respect to the third frusto-conical surface in a second circumferential direction, opposite the first circumferential direction.

20 Claims, 4 Drawing Sheets

MULTI-POSITION CAMSHAFT PHASER WITH TWO ONE-WAY CLUTCHES

TECHNICAL FIELD

The present disclosure relates to camshaft phaser with two one-way clutches. An axially displaceable component is used to engage and disengage the one-way clutches to enable the phaser to shift between an advance mode and a retard mode.

BACKGROUND

It is known to use hydraulic fluid in an engine to implement phasing of a camshaft for the engine. However, for some engines, in particular smaller engines for outboard motors, motorcycles, or all-terrain vehicles, the supply of hydraulic fluid is limited, which complicates the use of the fluid for phasing and may compromise the operation of the engine and the camshaft phasing.

SUMMARY

According to aspects illustrated herein, there is provided a camshaft phaser, including: a gear arranged to receive torque from an engine; a housing non-rotatably connected to the gear; and a phase adjustment assembly. The assembly includes: first and second frusto-conical shaped surfaces tapering radially inward in first and second opposite axial directions, respectively and arranged to non-rotatably connect to a camshaft; third and fourth frusto-conical shaped surfaces tapering radially inward in the first and second axial direction, respectively; and a displacement assembly. The displacement assembly is arranged to: for an advance mode, displace the first frusto-conical shaped surface in the first axial direction to non-rotatably connect the first frusto-conical shaped surface to the third frusto-conical shaped surface and so that the second frusto-conical shaped surface is rotatable with respect to the fourth frusto-conical shaped surface in a first circumferential direction; and for a retard mode, displace the second frusto-conical shaped surface in the second axial direction to non-rotatably connect the second frusto-conical shaped surface non-rotatably to the fourth frusto-conical shaped surface and so that the first frusto-conical shaped surface is rotatable with respect to the third frusto-conical shaped surface in a second circumferential direction, opposite the first circumferential direction.

According to aspects illustrated herein, there is provided a camshaft assembly, including: a gear arranged to receive torque from an engine; a housing non-rotatably connected to the gear; and a phase adjustment assembly. The phaser adjustment assembly includes: a first one-way clutch with a first frusto-conical shaped surface; a second one-way clutch with a second frusto-conical shaped surface; a cone-clutch component arranged to non-rotatable connect to a camshaft and including third and fourth frusto-conical shaped surfaces; and a displacement assembly including a resilient element and a hydraulic assembly including a chamber at least partially formed by the housing and the cone-clutch component. The displacement assembly is arranged to: for an advance mode, displace the third frusto-conical shaped surface in the first axial direction so that the first frusto-conical shaped surface non-rotatably connects to the third frusto-conical shaped surface and the fourth frusto-conical shaped surface is rotatable with respect to the housing in a first circumferential direction; and for a retard mode, displace the fourth frusto-conical shaped surface in the second axial direction so that the second frusto-conical shaped surface non-rotatably connects to the fourth frusto-conical shaped surface and the third frusto-conical shaped surface is rotatable with respect to the housing in a second circumferential direction, opposite the first circumferential direction.

According to aspects illustrated herein, there is provided a method of phasing a camshaft, including: receiving, using a gear non-rotatably connected to a housing, torque from an engine; for an advance mode, displacing a first frusto-conical shaped surface, tapering radially inward in a first axial direction and non-rotatably connected to the camshaft, in the first axial direction; non-rotatably connecting the first frusto-conical shaped surface to a third frusto-conical shaped surface; rotating, with respect to the housing in a first circumferential direction, a second frusto-conical shaped surface tapering radially inward in a second axial direction opposite the first axial direction and non-rotatably connected to the camshaft; for a retard mode, displacing the second frusto-conical shaped surface in the second axial direction; non-rotatably connecting the second frusto-conical shaped surface non-rotatably to a fourth frusto-conical shaped surface; and rotating, with respect to the housing in a second circumferential direction, opposite the first circumferential direction, the first frusto-conical shaped surface with respect to the housing.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
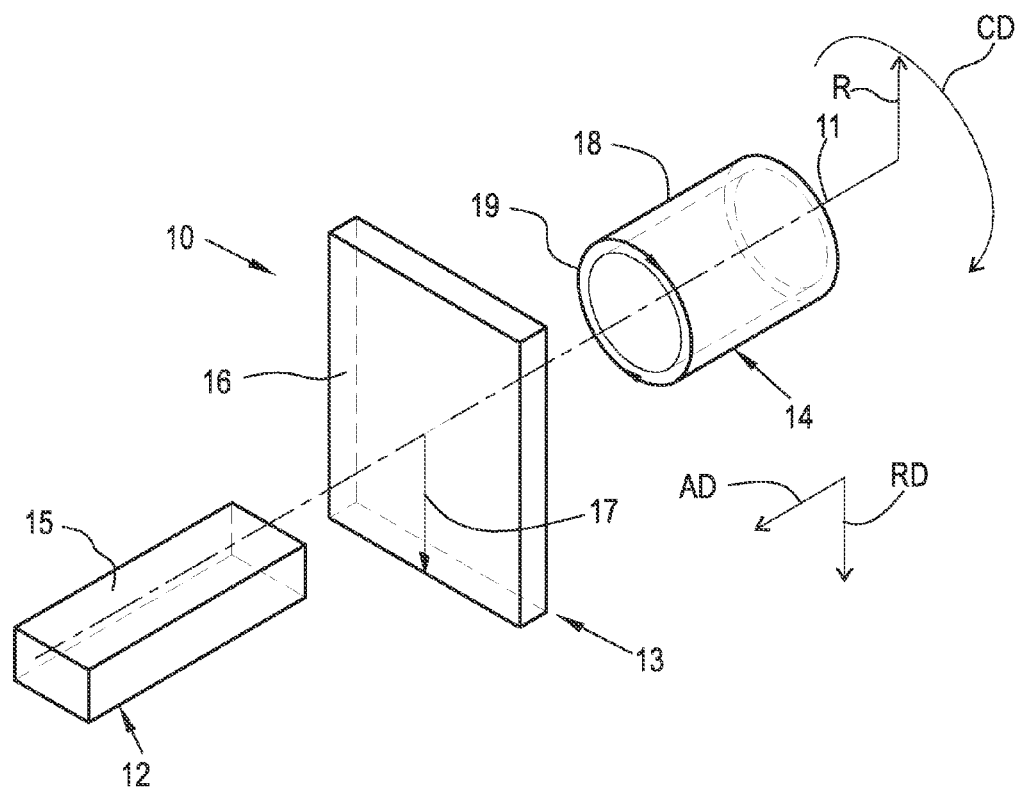
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
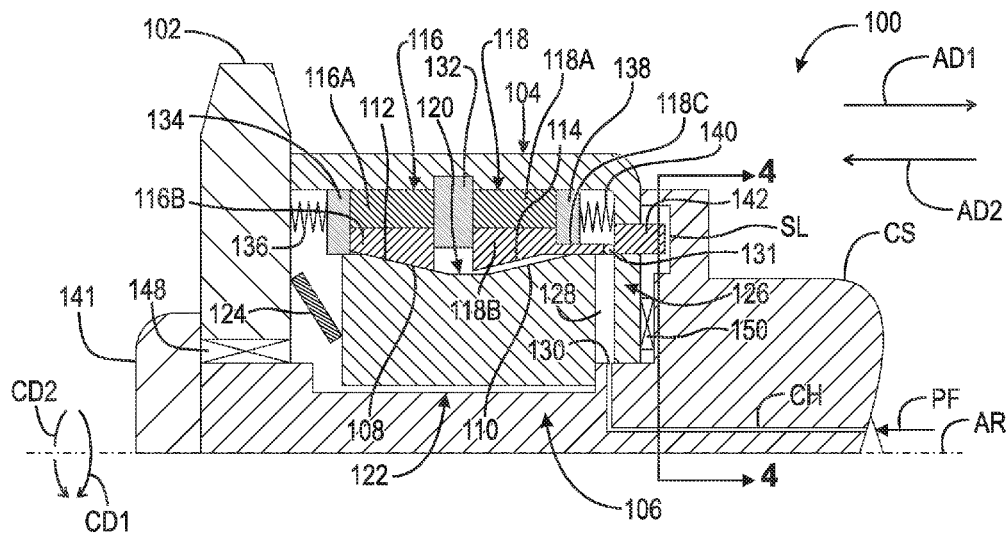
FIG. 2 is cross-sectional view of a camshaft phaser with one-way cone clutches in an advance mode.

FIG. 2 is cross-sectional view of camshaft phaser 100 with one-way cone clutches in an advance mode.

Figure 3:
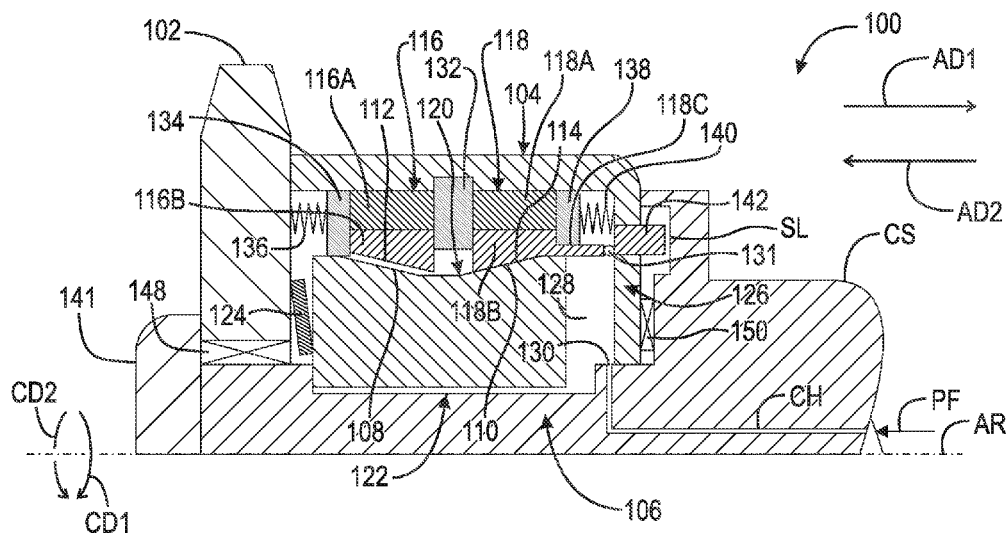
FIG. 3 is a cross-sectional view of the camshaft phaser shown in FIG. 2 in a retard mode.

FIG. 3 is a cross-sectional view of camshaft phaser 100 shown in FIG. 2 in a retard mode. The following should be viewed in light of FIGS. 2 and 3. Phaser 100 includes: axis of rotation AR, gear 102 arranged to receive torque from an engine (not shown); housing 104 non-rotatably connected to gear 102; and phase adjustment assembly 106. Assembly 106 includes frusto-conical shaped surfaces 108, 110, 112 and 114. Surfaces 108 and 110 taper radially inward in opposite axial directions, respectively, and are arranged to non-rotatably connect to camshaft CS. In an example embodiment, surfaces 108 and 110 taper radially inward in axial directions AD1 and AD2, respectively. Surfaces 112 and 114 taper radially inward in opposite axial directions, respectively. In an example embodiment, surfaces 112 and 114 taper radially inward in axial directions AD1 and AD2, respectively. By frusto-conical, we mean having the shape of a frustum of a cone. By frustrum we mean the part of a conical shape left after cutting off a top portion of the shape with a plane parallel to the base of the shape.

In an example embodiment (not shown), surfaces 108 and 112 slope radially inward in direction AD2 and surfaces 110 and 114 slope radially inward in direction AD1.

For an advance mode, phase adjustment assembly 106 is arranged to: displace frusto-conical shaped surface 108 in axial direction AD1 so that: frusto-conical shaped surface 108 non-rotatably connects to frusto-conical shaped surface 112; and frusto-conical shaped surface 110 is rotatable with respect to frusto-conical shaped surface 114 in a circumferential direction, for example CD1. As further described below, in the advance mode, camshaft CS as well as surface 110 are rotatable with respect to housing 104.

For a retard mode, phase adjustment assembly 106 is arranged to: displace frusto-conical shaped surface 110 in axial direction AD2 so that: frusto-conical shaped surface 110 non-rotatably connects to the frusto-conical shaped surface 114; and frusto-conical shaped surface 108 is rotatable with respect frusto-conical shaped surface 112 in an opposite circumferential direction, for example CD2, opposite circumferential direction CD1. As further described below, in the retard mode, camshaft CS as well as surface 108 are rotatable with respect to housing 104. By "non-rotatably connected" components, we mean that the two components are connected so that whenever one of the components rotates the other component rotates and vice versa. Further, there is no relative rotation between the components. Axial displacement between the components is possible. In the discussion that follows, it is assumed that gear 102 rotates and transmits torque in direction CD1 and that in the advance mode, camshaft CS, surface 110, and assembly 106 rotate in direction CD1. However, it should be understood that these directions can be reversed.

For the advance mode, the non-rotatable connection of frusto-conical shaped surfaces 108 and 112 is arranged to block rotation of frusto-conical shaped surface 108, with respect to housing 104, in circumferential direction CD2. For the retard mode, the non-rotatable connection of the frusto-conical shaped surfaces 110 and 114 is arranged to block rotation of the frusto-conical shaped surface 110, with respect to housing 104, in circumferential direction CD1.

Phase adjustment assembly 106 includes one-way clutches 116 and 118 and cone-connection component 120. Clutches 116 and 118 include frusto-conical shaped surfaces 112 and 114, respectively. Component 120 includes frusto-conical shaped surfaces 108 and 110. Component 120 is arranged to non-rotatably connect to camshaft CS. For example, splined connection 122 non-rotatably connects component 120 and the camshaft while enabling component 120 to axially displace with respect to the camshaft. Assembly 106 includes resilient element 124 and hydraulic assembly 126. Element 124 urges cone-clutch component 120 in axial direction AD1 and assembly 126 is arranged to displace cone-clutch component 120 in axial direction AD2. Thus, element 124 is used to implement the advance mode and assembly 126 is used to implement the retard mode. Element 124 can be any resilient element known in the art, including but not limited to, a diaphragm spring or a wave spring. It should be understood that the roles of element 124 and assembly 126 can be reversed so that element 124 is used to implement the retard mode and assembly 126 is used to implement the advance mode.

In an example embodiment, assembly 126 includes chamber 128, at least partially formed by cone-clutch component 120 and housing 104, at least one orifice 130 arranged to connect to at least one respective channel CH in the camshaft, and seal 131, for example, O-ring 131. In the example of FIGS. 2 and 3, chamber 128 is formed by housing 104, O-ring 131, extension 118C of race 118B, component 120, and camshaft CS. Chamber 128 is arranged to receive pressurized fluid PF through orifice(s) 130 and respective channel(s) CH to displace cone-clutch component in axial direction AD2, against the force applied by element 124. When fluid PF is withdrawn from chamber 128, element 124 displaces component 120 in direction AD1.

Clutch 116 includes: outer race 116A non-rotatably connected to housing 104; and inner race 116B including frusto-conical shaped surface 112. Clutch 118 includes: outer race 118A non-rotatably connected to housing 104; and inner race 118B including frusto-conical shaped surface 114. Clutches 116 and 118 can be any one-way clutches known in the art, including, but not limited to, roller one-way clutches and sprag one-way clutches.

In an example embodiment, one-way clutches 116 and 118 are axially fixed with respect to housing 104. For example, centering piece 132, for example, a snap ring, blocks movement of clutches 116 and 118 in directions AD1 and AD2, respectively. For example: blocking plate 134 and resilient element 136 urge clutch 116 in direction AD1 against piece 132; and, blocking plate 138 and resilient element 140 urge clutch 118 in direction AD2 against piece 132. Nut 141 secures phaser 100 to camshaft CS. Elements 136 and 140 can be any resilient elements known in the art, including but not limited to, coil springs, diaphragm springs, and wave springs.

Figure 4:
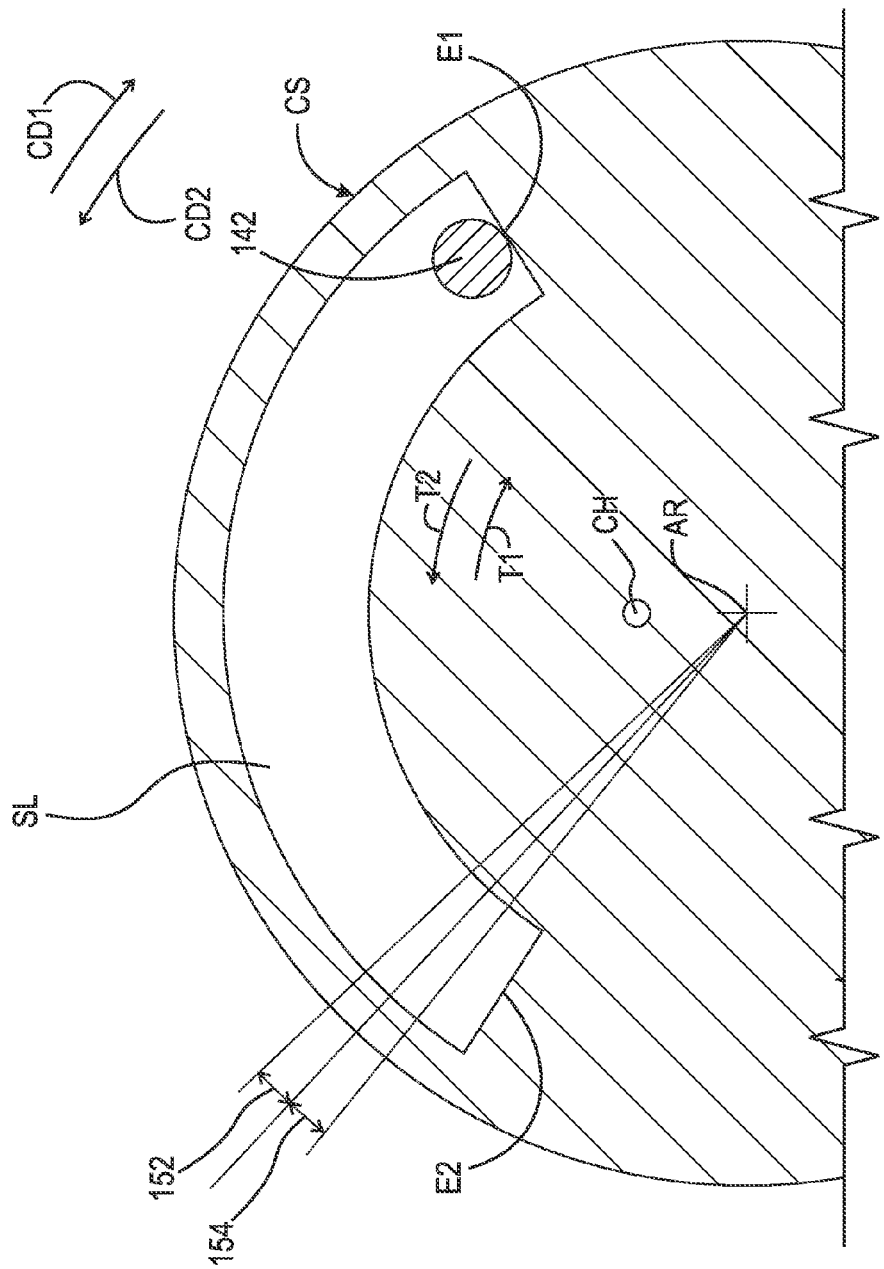
FIG. 4 is a partial cross-sectional view generally along line 4-4 in FIG. 2.

FIG. 4 is a partial cross-sectional view generally along line 4-4 in FIG. 2. The following should be viewed in light of FIGS. 2 through 4. In an example embodiment, housing 104 includes at least one pin 142 disposed in circumferentially curved slots SL in camshaft CS. Each pin 142 extends in axial direction AD1. Each slot SL includes circumferential end walls E1 and E2. Although a particular configuration of pin 142 and slot SL is shown in the figures, it should be understood that configurations of pin 142 and slot SL are possible. It also should be understood that phaser 100 can include multiple pins 142 disposed in respective slots SL.

Pin 142 and end walls E1 and E2 act as stops to limit the rotational displacement of camshaft CS with respect to housing 104 and gear 102 in the advance and retard modes. For example, to transition from the retard mode to the advance mode, component 120 is displaced in direction AD1 so that component 120 and camshaft CS rotate with respect to housing 104 in direction CD1 until end pin 142 contacts end walls E1, preventing further rotation of camshaft CS in direction CD1. For example, to transition from the advance mode to the retard mode, component 120 is displaced in direction AD2 so that component 120 and camshaft CS rotate with respect to housing 104 in direction CD2 until pin 142 contacts end walls E2, preventing further rotation of camshaft CS in direction CD2.

In an example embodiment, phaser 100 includes bearings 148 and 150 to enable rotation of gear 102 and housing 104 with respect to camshaft CS.

The following further describes the operation of phaser 100. In the discussion that follows, gear 102 receives torque from the engine in direction CD1. In the advance mode, the circumferential position of camshaft CS with respect to gear 102 and housing 104 is shifted in direction CD1. In the retard mode, the circumferential position of camshaft CS with respect to gear 102 and housing 104 is shifted in direction CD2.

As is known in the art, torsional forces T1 and T2 are transmitted from camshaft CS, in directions CD1 and CD2, respectively, to component 120 during operation of phaser 100. The torsional force forces are due to interaction of cam lobes (not shown) on camshaft CS with various components of a valve train (not shown) of which camshaft CS is a part. Torsional forces T1 and T2 are transmitted in a repeating cycle. Housing 104 rotates in direction CD1 (due to torque from gear 102) however, torsional force T1 urges component 120 in direction CD1 with respect to the housing and torsional force T2 urges component 120 in direction CD2 with respect to the housing. During operation, housing 104, component 120, and camshaft CS are always rotating in direction CD1. However, unchecked, torque T1 and T2 cause camshaft CS and component 120 to speed up and slow down relative to gear 102.

Since surfaces 110 and 114 are not engaged for the advance mode, each iteration of force T1 causes relative rotation of camshaft CS, component 120, and surface 110 by amount 152 with respect to housing 104, in direction CD1. Each iteration of force T2 urges component 120 in direction CD2. However, surfaces 108 and 112 are non-rotatably connected and race 116B can only rotate in direction CD1. Therefore, rotation of surface 108, component 120, and camshaft CS in direction CD2 is blocked by clutch 116. Thus, for every cycle of forces T1 and T2, camshaft CS rotates by amount 152 in direction CD1. Camshaft CS continues to rotate by amounts 152 in direction CD1 until pin 142 contacts E1.

Since surfaces 108 and 112 are not engaged for the retard mode, each iteration of force T2 causes relative rotation of camshaft CS, component 120, and surface 108 by amount 154 with respect to housing 104, in direction CD2. Each iteration of force T1 urges component 120 in direction CD1. However, surfaces 110 and 114 are non-rotatably connected and race 118B can only rotate in direction CD2. Therefore, rotation of surface 110, component 120, and camshaft CS in direction CD1 is blocked by clutch 116. Thus, for every cycle of forces T1 and T2, camshaft CS rotates by amount 154 in direction CD2. Camshaft CS continues to rotate by amounts 154 in direction CD2 until pin 142 contacts E2.

Figure 5:
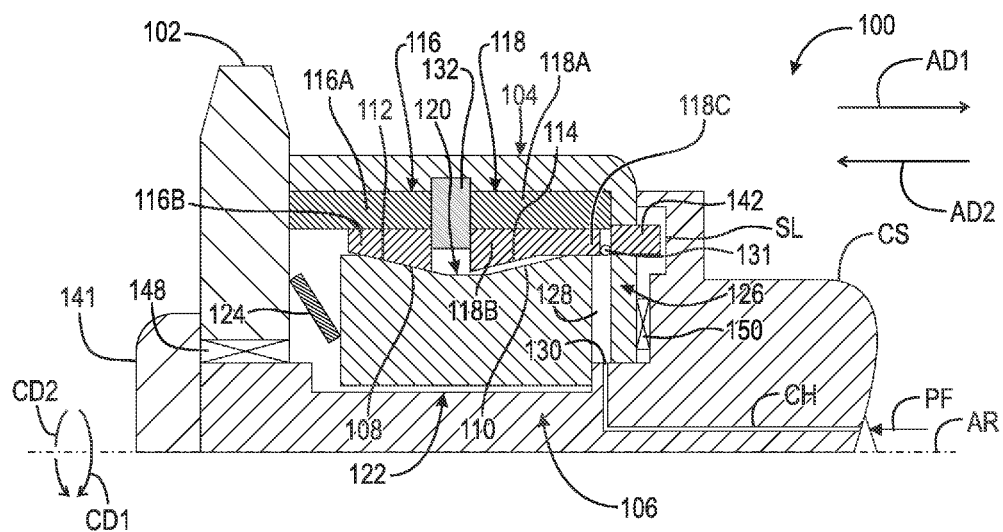
FIG. 5 is cross-sectional view of a camshaft phaser with one-way cone clutches in an advance mode.

FIG. 5 is cross-sectional view of a camshaft phaser 100 with one-way cone clutches in an advance mode.

Figure 6:
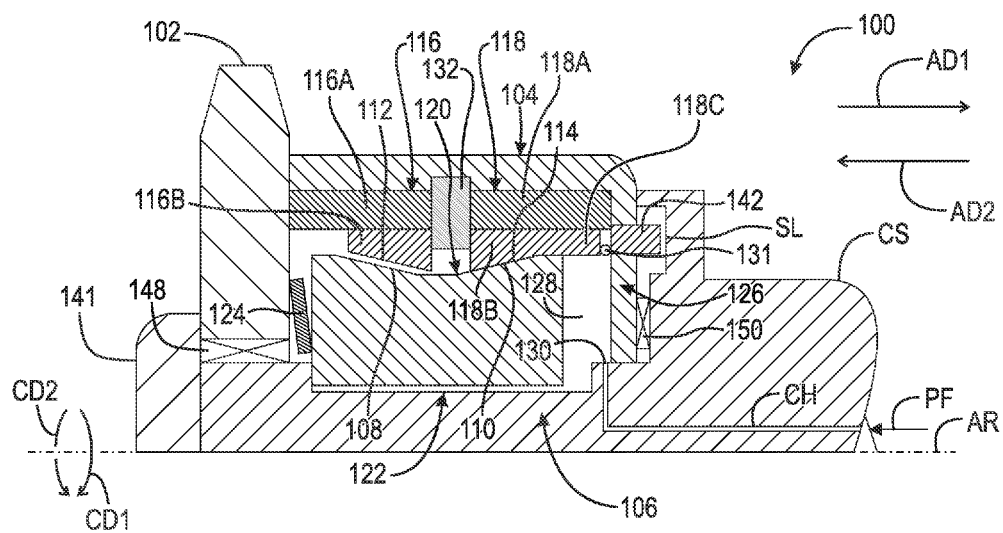
FIG. 6 is a cross-sectional view of the camshaft phaser shown in FIG. 5 in a retard mode.

FIG. 6 is a cross-sectional view of camshaft phaser shown in FIG. 5 in a retard mode. The following should be viewed in light of FIGS. 2 through 6. Except as noted, the discussion of phaser 100 depicted in FIGS. 2 through 4 is applicable to phaser 100 in FIGS. 5 and 6. In an example embodiment, outer races 116A and 118A are modified to make contact with gear 102 and housing 104, respectively. This example embodiment eliminates the need for plates 134 and 138 and resilient elements 136 and 140.

The following should be viewed in light of FIGS. 2 through 6. The following describes a method for phasing a camshaft. Although the method is presented as a sequence of steps for clarity, no order should be inferred from the sequence unless explicitly stated. A first step receives, using a gear non-rotatably connected to a housing, torque from an engine. A second step, for an advance mode, displaces a first frusto-conical shaped surface, tapering radially inward in a first axial direction and non-rotatably connected to the camshaft, in the first axial direction. A third step non-rotatably connects the first frusto-conical shaped surface to a third frusto-conical shaped surface. A fourth step rotates, with respect to the housing in a first circumferential direction, a second frusto-conical shaped surface tapering radially inward in a second axial direction opposite the first axial direction and non-rotatably connected to the camshaft. A fifth step, for a retard mode, displaces the second frusto-conical shaped surface in the second axial direction. A sixth step non-rotatably connects the second frusto-conical shaped surface non-rotatably to a fourth frusto-conical shaped surface. A seventh step rotates, with respect to the housing in a second circumferential direction, opposite the first circumferential direction, the first frusto-conical shaped surface with respect to the housing.

An eighth step blocks, using the non-rotatable connection of the first and third frusto-conical shaped surfaces, rotation of the first frusto-conical shaped surface, with respect to the housing, in the second circumferential direction. A ninth step blocks, using the non-rotatable connection of the second and fourth frusto-conical shaped surfaces, rotation of the second frusto-conical shaped surface, with respect to the housing, in the first circumferential direction.

In an example embodiment: axially displacing the first and second frusto-conical shaped surfaces in the first and second axial directions, respectively, includes axially displacing, in the first and second axial directions, respectively, a cone-connection component including the first and second frusto-conical shaped surfaces and non-rotatably connected to the camshaft; non-rotatably connecting the first frusto-conical shaped surface to the third frusto-conical shaped surface includes non-rotatably connecting the first frusto-conical shaped surface to a first one-way clutch including a first inner race including the third frusto-conical shaped surface and a first outer race non-rotatably connected to the housing; and non-rotatably connecting the second frusto-conical shaped surface to the fourth frusto-conical shaped surface includes non-rotatably connecting the second frusto-conical shaped surface to a second one-way clutch including a second inner race including the fourth frusto-conical shaped surface and a second outer race non-rotatably connected to the housing.

In an example embodiment: a tenth step axially displaces, using a resilient element, the first frusto-conical shaped surface in the first axial direction; and an eleventh step axially displaces, using a hydraulic circuit, the second frusto-conical shaped surface in the second axial direction. In an example embodiment, axially displacing, using the hydraulic circuit, the second frusto-conical shaped surface in the second axial direction includes receiving pressurized fluid in a chamber at least partially formed by the housing.

Advantageously, phaser 100 and a method using phaser 100 provide a robust camshaft phasing with a minimal use of hydraulic fluid in an engine including the camshaft. This is particularly advantageous for smaller engines for outboard motors, motorcycles, or all-terrain vehicles that have limited supplies of available hydraulic fluid. For example, no hydraulic fluid is needed to implement the retard mode, which is implemented by resilient element 124. Further, the control scheme for phaser 100 is very simple. To implement the retard phase, the hydraulic circuit for channel CH is de-pressurized, for example, opened to ambient air pressure. To implement the advance phase only a single command to provide a steady fluid pressure to chamber 128 is needed.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:
1. A camshaft phaser, comprising:
a gear arranged to receive torque from an engine;
a housing non-rotatably connected to the gear; and,
a phase adjustment assembly including:
first and second frusto-conical shaped surfaces:
tapering radially inward in first and second opposite axial directions, respectively; and,
arranged to non-rotatably connect to a camshaft;
third and fourth frusto-conical shaped surfaces tapering radially inward in the first and second axial direction, respectively; and,
a displacement assembly arranged to:
for an advance mode, displace the first frusto-conical shaped surface in the first axial direction:
to non-rotatably connect the first frusto-conical shaped surface to the third frusto-conical shaped surface; and,
so that the second frusto-conical shaped surface is rotatable with respect to the fourth frusto-conical shaped surface in a first circumferential direction; and,
for a retard mode, displace the second frusto-conical shaped surface in the second axial direction:
to non-rotatably connect the second frusto-conical shaped surface to the fourth frusto-conical shaped surface; and,
so that the first frusto-conical shaped surface is rotatable with respect to the third frusto-conical shaped surface in a second circumferential direction, opposite the first circumferential direction.

2. The camshaft phaser of claim 1, wherein:
for the advance mode, the non-rotatable connection of the first and third frusto-conical shaped surfaces is arranged to block rotation of the first frusto-conical shaped surface, with respect to the housing, in the second circumferential direction; and,
for the retard mode, the non-rotatable connection of the second and fourth frusto-conical shaped surfaces is arranged to block rotation of the second frusto-conical shaped surface, with respect to the housing, in the first circumferential direction.

3. The camshaft phaser of claim 1, wherein:
the phase adjustment assembly includes first and second one-way clutches;
the first one-way clutch includes the third frusto-conical shaped surface; and,
the second one-way clutch includes the fourth frusto-conical shaped surface.

4. The camshaft phaser of claim 3, wherein the phase adjustment assembly includes a cone-clutch component:
arranged to non-rotatably connect to the camshaft; and,
including the first and second frusto-conical shaped surfaces.

5. The camshaft phaser of claim 4, wherein the displacement assembly includes:
a resilient element urging the cone-clutch component in the first axial direction; and,
a hydraulic assembly arranged to displace the cone-clutch component in the second axial direction.

6. The camshaft phaser of claim 5, wherein the hydraulic assembly includes a chamber:
at least partially formed by the cone-clutch component;
including at least one orifice arranged to connect to a channel in the camshaft; and,
arranged to receive pressurized fluid through the at least one orifice to displace the cone-clutch component in the second axial direction.

7. The camshaft phaser of claim 3, wherein:
the first one-way clutch includes:
a first outer race non-rotatably connected to the housing; and, a first inner race including the third frusto-conical shaped surface; and,
the second one-way clutch includes:
a second outer race non-rotatably connected to the housing; and,
a second inner race including the fourth frusto-conical shaped surface.

8. The camshaft phaser of claim 3, wherein the first and second one-way clutches are axially fixed with respect to the housing.

9. A camshaft phaser, comprising:
a gear arranged to receive torque from an engine;
a housing non-rotatably connected to the gear; and,
a phase adjustment assembly including:
  a first one-way clutch with a first frusto-conical shaped surface;
  a second one-way clutch with a second frusto-conical shaped surface;
  a cone-clutch component:
    arranged to non-rotatably connect to a camshaft; and,
    including third and fourth frusto-conical shaped surfaces; and,
  a displacement assembly including:
    a resilient element; and,
    a hydraulic assembly including a chamber at least partially formed by the housing and the cone-clutch component, wherein the displacement assembly is arranged to:
for an advance mode, displace the third frusto-conical shaped surface in the first axial direction so that:
  the first frusto-conical shaped surface non-rotatably connects to the third frusto-conical shaped surface; and,
  the fourth frusto-conical shaped surface is rotatable with respect to the housing in a first circumferential direction; and,
for a retard mode, displace the fourth frusto-conical shaped surface in the second axial direction so that:
  the second frusto-conical shaped surface non-rotatably connects to the fourth frusto-conical shaped surface; and,
  the third frusto-conical shaped surface is rotatable with respect to the housing in a second circumferential direction, opposite the first circumferential direction.

10. The camshaft phaser of claim 9, wherein:
the first and third frusto-conical shaped surfaces taper radially inward in the first axial direction; and,
the second and fourth frusto-conical shaped surfaces taper radially inward in the second axial direction.

11. The camshaft phaser of claim 9, wherein:
for the advance mode, the first one-way clutch is arranged to block rotation of the cone-clutch component in the second circumferential direction.

12. The camshaft phaser of claim 9, wherein:
for the retard mode, the second one-way clutch is arranged to block rotation of the cone-clutch component in the first circumferential direction.

13. The camshaft phaser of claim 9, wherein:
the resilient element urges the cone-connection component in the first axial direction;
the chamber includes at least one orifice arranged to open to at least one respective channel in the camshaft; and,
the at least one orifice is arranged to receive pressurized fluid from the at least one respective channel to displace the cone-connection component in the second axial direction.

14. The camshaft phaser of claim 9, wherein:
the first one-way clutch includes:
  a first outer race non-rotatably connected to the housing; and,
  a first inner race including the first frusto-conical shaped surface; and,
the second one-way clutch includes:
  a second outer race non-rotatably connected to the housing; and,
  a second inner race including the second frusto-conical shaped surface.

15. The camshaft phaser of claim 9, wherein the first and second one-way clutches are axially fixed with respect to the housing.

16. A method of phasing a camshaft, comprising:
receiving, using a gear non-rotatably connected to a housing, torque from an engine;
for an advance mode, displacing a first frusto-conical shaped surface, tapering radially inward in a first axial direction and non-rotatably connected to the camshaft, in the first axial direction;
non-rotatably connecting the first frusto-conical shaped surface to a third frusto-conical shaped surface;
rotating, with respect to the housing in a first circumferential direction, a second frusto-conical shaped surface tapering radially inward in a second axial direction opposite the first axial direction and non-rotatably connected to the camshaft;
for a retard mode, displacing the second frusto-conical shaped surface in the second axial direction;
non-rotatably connecting the second frusto-conical shaped surface to a fourth frusto-conical shaped surface; and,
rotating, with respect to the housing in a second circumferential direction, opposite the first circumferential direction, the first frusto-conical shaped surface with respect to the housing.

17. The method of claim 16, further comprising:
blocking, using the non-rotatable connection of the first and third frusto-conical shaped surfaces, rotation of the first frusto-conical shaped surface, with respect to the housing, in the second circumferential direction; and,
blocking, using the non-rotatable connection of the second and fourth frusto-conical shaped surfaces, rotation of the second frusto-conical shaped surface, with respect to the housing, in the first circumferential direction.

18. The method of claim 16, wherein:
axially displacing the first and second frusto-conical shaped surfaces in the first and second axial directions, respectively, includes axially displacing, in the first and second axial directions, respectively, a cone-connection component non-rotatably connected to the camshaft and including the first and second frusto-conical shaped surfaces;
non-rotatably connecting the first frusto-conical shaped surface to the third frusto-conical shaped surface includes non-rotatably connecting the first frusto-conical shaped surface to a first one-way clutch including:
  a first inner race including the third frusto-conical shaped surface; and,
  a first outer race non-rotatably connected to the housing; and,
non-rotatably connecting the second frusto-conical shaped surface to the fourth frusto-conical shaped surface includes non-rotatably connecting the second frusto-conical shaped surface to a second one-way clutch including:

a second inner race including the fourth frusto-conical shaped surface; and, a second outer race non-rotatably connected to the housing.

19. The method of claim 16, further comprising:

axially displacing, using a resilient element, the first frusto-conical shaped surface in the first axial direction; and, axially displacing, using a hydraulic circuit, the second frusto-conical shaped surface in the second axial direction.

20. The method of claim 19, wherein axially displacing, using the hydraulic circuit, the second frusto-conical shaped surface in the second axial direction includes receiving pressurized fluid in a chamber at least partially formed by the housing.

* * * * *